(12) United States Patent
Kirchner et al.

(10) Patent No.: US 10,804,671 B1
(45) Date of Patent: *Oct. 13, 2020

(54) TERAHERTZ MAGNON GENERATOR COMPRISING PLURALITY OF SINGLE TERAHERTZ MAGNON LASERS

(71) Applicant: Magtera, Inc., Walnut Creek, CA (US)

(72) Inventors: Nicholas J. Kirchner, Gilroy, CA (US); Boris G. Tankhilevich, Walnut Creek, CA (US); Charles Thomas Thurman, Livermore, CA (US)

(73) Assignee: Magtera, Inc., Walnut Creek, CA (US)

( * ) Notice: Subject to any disclaimer, the term of this patent is extended or adjusted under 35 U.S.C. 154(b) by 55 days.

This patent is subject to a terminal disclaimer.

(21) Appl. No.: 16/245,247

(22) Filed: Jan. 10, 2019

(51) Int. Cl.
*H01S 1/02* (2006.01)

(52) U.S. Cl.
CPC ............ *H01S 1/02* (2013.01); *H01S 2302/02* (2013.01)

(58) Field of Classification Search
CPC .. H01S 5/04252; H01S 5/0213; H01S 5/3402; H01S 5/0218; H01S 5/0622; H01F 41/32
USPC .............................................. 372/4; 359/342
See application file for complete search history.

(56) References Cited

U.S. PATENT DOCUMENTS

| | | | |
|---|---|---|---|
| 7,430,074 B2 * | 9/2008 | Korenblit | H01S 1/02 359/342 |
| 7,508,578 B2 * | 3/2009 | Korenblit | H01S 1/02 359/342 |
| 7,982,946 B1 * | 7/2011 | Korenblit | H04B 10/00 359/342 |
| 8,031,397 B1 | 10/2011 | Korenblit et al. | |
| 9,132,451 B1 | 9/2015 | Tankhilevich | |
| 9,136,665 B1 | 9/2015 | Tankhilevich et al. | |
| 9,418,648 B1 | 8/2016 | Tankhilevich | |
| 2006/0118839 A1 | 6/2006 | Sugahara et al. | |
| 2012/0091548 A1 | 4/2012 | Sukegawa et al. | |
| 2012/0112299 A1 | 5/2012 | Inomata et al. | |

OTHER PUBLICATIONS

International Preliminary Report on Patentability received for PCT Application Serial No. PCT/US2020/012985 dated Apr. 2, 2020, 18 pages.
Vilkov et al., "Generation of Terahertz Radiation Spectra by Radiation Sources Based on Solid-State Micro—and Nanostructures and Detection of Terahertz Spectra", DOI: 10.1134/S106422691809022X, Sep. 28, 2018, pp. 1015-1026.

(Continued)

*Primary Examiner* — Tuan N Nguyen
(74) *Attorney, Agent, or Firm* — Amin, Turocy & Watson, LLP (57) ABSTRACT

An apparatus for generation of tunable terahertz radiation is provided. The apparatus comprises: a plurality of terahertz magnon laser generators, whereas at least one such terahertz magnon laser generator comprises a multilayer column, and a terahertz transparent medium separating at least two such terahertz magnon laser generators. At least one such multilayer column further comprises: a substrate, a bottom electrode coupled with the substrate, a bottom layer coupled with the bottom electrode, a tunnel junction coupled with the bottom layer, a top layer coupled with the tunnel junction, a pinning layer coupled with the spin injector, and a top electrode coupled with the pinning layer.

16 Claims, 4 Drawing Sheets

(56) References Cited

OTHER PUBLICATIONS

Sulymenko et al., "Terahertz-Frequency Signal Source Based on an Antiferromagnetic Tunnel Junction ", DOI: 10.1109/LMAG.2018.2852291, Jul. 2, 2018, 5 pages.
Gulyaev et al., "Generation of Terahertz Radiation in Magnetic Junctions based on Nanowires." DOI: 10.1134/ S1063785019030271, May 6, 2019, pp. 271-273.
International Preliminary Report on Patentability received for PCT Application Serial No. PCT/US2020/012229 dated Apr. 7, 2020, 19 pages.
International Preliminary Report on Patentability received for PCT Application Serial No. PCT/US2020/012982 dated Apr. 20, 2020, 17 pages.
Notice of Allowance received for U.S. Appl. No. 16/245,224 dated Apr. 14, 2020, 27 pages.
Notice of Allowance received for U.S. Appl. No. 16/704,090 dated May 26, 2020, 35 pages.

* cited by examiner

TERAHERTZ MAGNON GENERATOR COMPRISING PLURALITY OF SINGLE TERAHERTZ MAGNON LASERS

TECHNICAL FIELD

The current invention relates to the field of magnon lasers employed to generate terahertz radiation.

BACKGROUND ART

Terahertz (THz) radiation, an electromagnetic radiation in a frequency interval from 0.1 THz to 30 THz, occupies the portion of the electromagnetic spectrum between the microwave band and the infrared band.

A THz photon has an energy that is less than the energy of an optical photon. That is why THz-ways can penetrate deep into the substance where the optical waves cannot penetrate. At THz frequencies, the molecules vibrate. That is why THz waves are useful in the study of molecules.

Indeed, the unique rotational and vibrational responses of molecules within the THz range provide information that is generally absent in optical, X-ray and NMR images. A THz wave can easily penetrate and inspect the insides of most dielectric materials, which are opaque to visible light and low contrast to X-rays, making THz waves a useful complementary imaging source.

For example, THz waves maintain reasonable penetration depth in certain common materials, such as clothes, plastic, wood, sand and soil. Therefore, THz technology has the potential to detect explosives packaged or buried within these materials because the explosives have unique THz spectral properties when compared to the surrounding materials. The spectral fingerprints of explosive materials can be expected in the THz band, and THz imaging can be applied for landmine detection. However, at present, efficient, compact, solid-state sources for the spectral range 0.1-30 THz are still lacking.

Indeed, broadband pulsed THz sources are usually based on the excitation of different materials with ultra-short laser pulses. Several different mechanisms have been exploited to generate THz radiation, including photo carrier acceleration in photo conducting antennas, second-order non-linear effects in electro-optic crystals etc For narrowband THz sources, solid-state lasers are often considered. They are based on inter-band transitions in narrow gap semiconductors or on inter sub band transitions, i.e. transitions in quantum confined structures, e.g. nanostructures, between confined conduction or valence states. To get THz radiation from direct inter band transitions, near zero gap semiconductors are required. For inter sub band transitions conventional wide gap materials can be used, but require precise complicated structures. At present the construction of multiple quantum-well semiconductor structures for laser emission is feasible.

The quantum cascade consists of a repeating structure, in which each repeat unit is made up of an injector and an active region. In the active region, a population inversion exists and electron transition to a lower energy level occurs, emitting photons at a specific wavelength. Kohler et al. (R. Kohler et al., Nature 417, 156 (2002)) designed a THz quantum cascade laser operating at 4.4 THz. The laser consisted of a total over 700 quantum wells, and demonstrated pulse operation at temperature of 10 K. For a review, please see, e.g., B Ferguson and X.-C. Zhang, Nat. Matter, 26 (2002).

The latest progress in QCL generators was reported by Manijeh Razeghi, et al. in Photonics Spectra, December, 48-51 (2016). The authors used nonlinear mixing of two QCL. However, the usage of nonlinear mixers invites the inherent limitations. Indeed, the nonlinear QCL mixers are very complicated devices (each such QCL comprising multiple barrier layers and multiple well layers that should be fabricated with the accuracy up to 0.1 nm), have low output power in continuous regime (these devices reach the power output up to 0.5 milliwatt only in pulsed regime); and have very limited tunability in the region of between (2-4.45) THz.

AdTech Optics located in the City of Industry, Calif., has been developing and producing innovative QC lasers since 2005. AdTech's QCLs are designed to cover most of the mid-infrared spectral range, from $\lambda=3.8$ μm (78 THz) to $\lambda=12.5$ μm (23.9 THz). Almost all of AdTech's QCLs operate continuously at room temperature and can be designed to work at a single frequency by use of distributed-feedback waveguide fabrication. However, AdTech's QCLs are only mechanically tunable which makes those QCL unpractical for the majority of applications including the spectrometric, communication, etc., to name just a few applications.

SUMMARY

This Summary is provided to introduce a selection of concepts that are further described below in the Detailed Description. This Summary is not intended to identify key or essential features of the claimed subject matter, nor is it intended to be used as an aid in determining the scope of the claimed subject matter.

An apparatus for generation of tunable terahertz radiation is provided. The apparatus comprises: a plurality of terahertz magnon laser generators, whereas at least one such terahertz magnon laser generator comprises a multilayer column, and a terahertz transparent medium separating at least two such terahertz magnon laser generators.

At least one such multilayer column further comprises: a substrate, a bottom electrode coupled with the substrate, a bottom layer coupled with the bottom electrode, a tunnel junction coupled with the bottom layer, a top layer coupled with the tunnel junction, a pinning layer coupled with the spin injector, and a top electrode coupled with the pinning layer. The bottom layer further comprises a Magnon Gain Medium. The top layer further comprises a spin injector.

DESCRIPTION OF THE DRAWINGS

The accompanying drawings, which are incorporated in and form a part of this specification, illustrate embodiments of the technology and, together with the description, explain the principles below.

DETAILED DESCRIPTION

Reference now be made in detail to the embodiments of the technology, examples of which are illustrated in the accompanying drawings. While the present technology will be described in conjunction with the various embodiments, it will be understood that they are not intended to limit the present technology to these embodiments. On the contrary, the present technology is intended to cover alternatives, modifications and equivalents, which may be included within the spirit and scope of the various embodiments as defined by the appended claims.

Furthermore, in the following detailed description, numerous specific-details are set forth in order to provide a thorough understanding of the presented embodiments. However, it will be obvious to one of ordinary skill in the art that the presented embodiments may be practiced without these specific details. In other instances, well known methods, procedures, components, and circuits have not been described in detail as not to unnecessarily obscure aspects of the presented embodiments.

Figure 1:
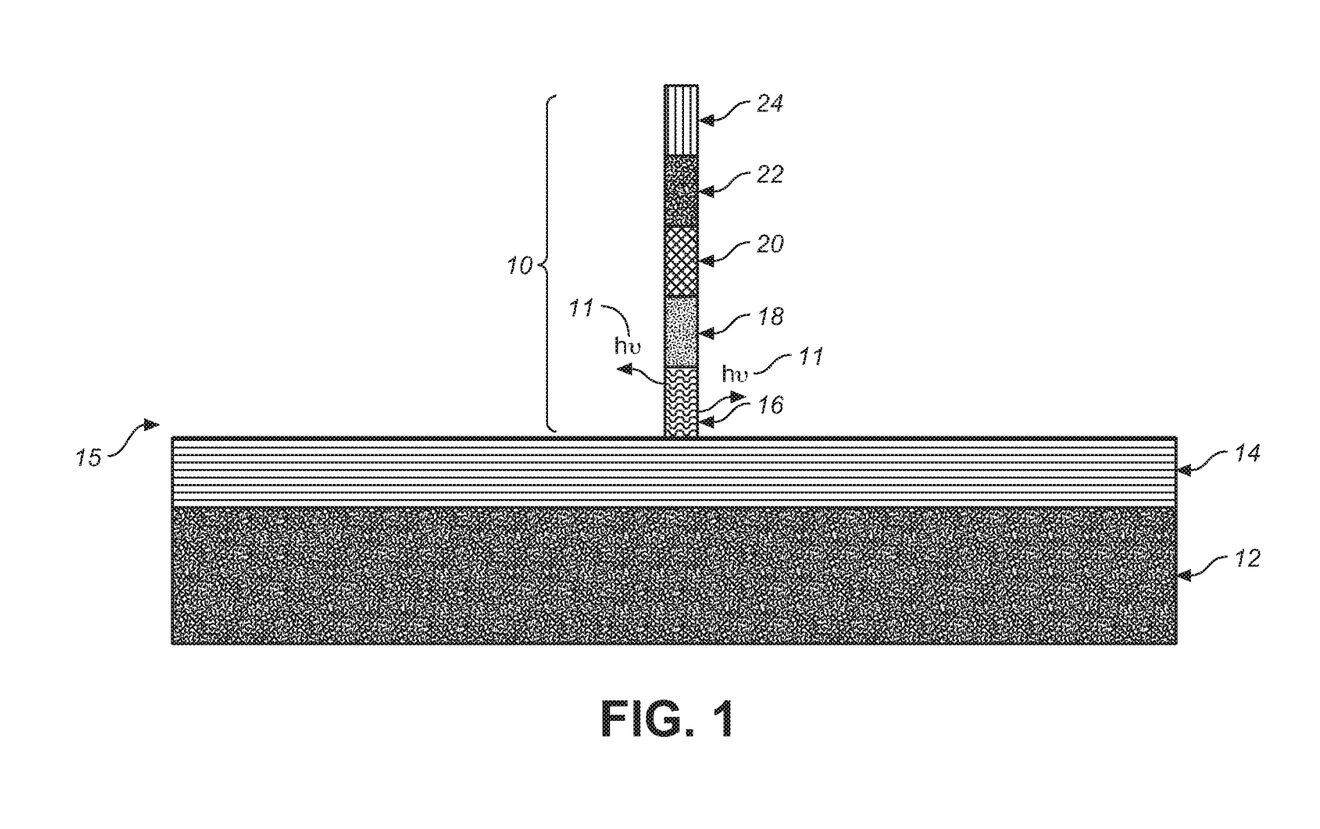
FIG. 1 depicts a front view of a single terahertz magnon laser comprising a substrate, a bottom electrode, and a single multilayer column further comprising a bottom layer coupled with said bottom electrode, a tunnel junction, a top layer, a pinning layer, and a top electrode for the purposes of the present technology.

In an embodiment of the present technology, FIG. 1 depicts a front view 15 of a single terahertz magnon laser comprising a substrate 12, a bottom electrode 14, and a single multilayer column 10.

In an embodiment of the present technology, the single multilayer column 10 (of FIG. 1) further comprises, a bottom layer 16, a tunnel junction 18, a top layer 20, a pinning layer 22, and a top electrode 24.

In an embodiment of the present technology, the substrate 12 (of FIG. 1) comprises gallium arsenide (GaAs). Gallium arsenide (GaAs) is a compound of the elements gallium and arsenic. It is a III-V direct bandgap semiconductor with a zinc blende crystal structure. Gallium arsenide is used in the manufacture of monolithic microwave integrated circuits.

GaAs is often used as a substrate material for the epitaxial growth of other III-V semiconductors including: Indium gallium arsenide, aluminum gallium arsenide and others.

GaAs can be fabricated by using molecular beam epitaxy (MBE). Molecular beam epitaxy takes place in high vacuum or ultra-high vacuum ($10^{-8}$-$10^{-12}$) Torr.

The most important aspect of MBE is the deposition rate (typically less than 3,000 nm per hour) that allows the films to grow epitaxially. These deposition rates require proportionally better vacuum to achieve the same impurity levels as other deposition techniques. The absence of carrier gases as well as the ultra-high vacuum environment result in the highest achievable purity of the grown films.

In solid source MBE, elements such as gallium and arsenic, in ultra-pure form, are heated in separate quasi-Knudsen effusion cells or electron beam evaporators until they begin to slowly sublime. The gaseous elements then condense on the wafer, where they may react with each other. In the example of gallium and arsenic, single-crystal gallium arsenide is formed. When evaporation sources such as copper or gold are used, the gaseous elements impinging on the surface may be adsorbed (after a time window where the impinging atoms will hop around the surface) or reflected. Atoms on the surface may also desorb.

Controlling the temperature of the source will control the rate of material impinging on the substrate surface and the temperature of the substrate will affect the rate of hopping or desorption. The term "beam" means that evaporated atoms do not interact with each other or vacuum chamber gases until they reach the wafer, due to the long mean free paths of the atoms.

In an embodiment of the present technology, the substrate 12 (of FIG. 1) comprises aluminum oxide ($Al_2O_3$).

In an embodiment of the present technology, the substrate 12 (of FIG. 1) comprises aluminum nitride (AlN).

In an embodiment of the present technology, the substrate 12 (of FIG. 1) comprises indium-tin-oxide (InTnO).

Indium tin oxide (ITO) is a ternary composition of indium, tin and oxygen in varying proportions. Depending on the oxygen content, it can either be described as a ceramic or alloy. Indium tin oxide is typically encountered as an oxygen-saturated composition with a formulation of 74% In, 18% $O_2$, and 8% Sn by weight. Oxygen-saturated compositions are so typical, that unsaturated compositions are termed oxygen-deficient ITO. It is transparent and colorless in thin layers, while in bulk form it is yellowish to grey. In the infrared region of the spectrum it acts as a metal-like mirror.

Indium tin oxide is one of the most widely used transparent conducting oxides because of its two main properties: its electrical conductivity and optical transparency, as well as the ease with which it can be deposited as a thin film. As with all transparent conducting films, a compromise must be made between conductivity and transparency, since increasing the thickness and increasing the concentration of charge carriers increases the material's conductivity, but decreases its transparency. Thin films of indium tin oxide are most commonly deposited on surfaces by physical vapor deposition. Often used is electron beam evaporation, or a range of sputter deposition techniques.

In an embodiment of the present technology, the substrate 12 (of FIG. 1) comprises silicon (Si).

Silicon is a chemical element with symbol Si and atomic number 14. A hard and brittle crystalline solid with a blue-gray metallic luster, it is a tetravalent metalloid. It is a member of group 14 in the periodic table, along with carbon above it and germanium, tin, lead, and flerovium below. It is rather unreactive, though less so than germanium, and has great chemical affinity for oxygen; as such, it was first prepared and characterized in pure form only in 1823 by Jöns Jakob Berzelius.

Silicon is the eighth most common element in the universe by mass, but very rarely occurs as the pure element in the Earth's crust. It is most widely distributed in dusts, sands, planetoids, and planets as various forms of silicon dioxide (silica) or silicates. Over 90% of the Earth's crust is composed of silicate minerals, making silicon the second most abundant element in the Earth's crust (about 28% by mass) after oxygen. A very highly purified silicon is used in integrated circuits.

In an embodiment of the present technology, the substrate 12 (of FIG. 1) comprises silicone on sapphire (SoS).

Silicon on sapphire (SOS) is a hetero-epitaxial process for integrated circuit manufacturing that consists of a thin layer (typically thinner than 0.6 μm) of silicon grown on a sapphire ($Al_2O_3$) wafer.

SOS is part of the Silicon on Insulator (SOI) family of CMOS technologies. Typically, high-purity artificially grown sapphire crystals are used. The silicon is usually deposited by the decomposition of silane gas (SiH4) on heated sapphire substrates. The advantage of sapphire is that it is an excellent electrical insulator, preventing stray currents caused by radiation from spreading to nearby circuit elements. SOS faced early challenges in commercial manufacturing because of difficulties in fabricating the very small transistors used in modern high-density applications. This is because the SOS process results in the formation of dislocations, twinning and stacking faults from crystal lattice disparities between the sapphire and silicon. Additionally, there is some aluminum, a p-type dopant, contamination from the substrate in the silicon closest to the interface.

The application of epitaxial growth of silicon on sapphire substrates for fabricating MOS devices involves a silicon purification process that mitigates crystal defects which result from a mismatch between sapphire and silicon lattices. For example, Peregrine Semiconductor's SP4T switch is formed on an SOS substrate where the final thickness of silicon is approximately 95 nm. Silicon is recessed in regions outside the polysilicon gate stack by poly oxidation and further recessed by the sidewall spacer formation process to a thickness of approximately 78 nm.

In an embodiment of the present technology, the substrate 12 (of FIG. 1) comprises and magnesium oxide (MgO).

Magnesium oxide (MgO), or magnesia, is a white hygroscopic solid mineral that occurs naturally as periclase and is a source of magnesium. It has an empirical formula of MgO and consists of a lattice of $Mg_2$ (+ions) and $O_2$ (−ions) held together by ionic bonding. Magnesium hydroxide forms in the presence of water ($MgO+H_2O\rightarrow Mg(OH)_2$), but it can be reversed by heating it to separate moisture.

Magnesium oxide was historically known as magnesia alba (literally, the white mineral from magnesia—other sources give magnesia alba as $MgCO_3$), to differentiate it from magnesia negra, a black mineral containing what is now known as manganese. While "magnesium oxide" normally refers to MgO, magnesium peroxide $MgO_2$ is also known as a compound. Per evolutionary crystal structure prediction, $MgO_2$ is thermodynamically stable at pressures above 116 GPa (gigapascals), and a totally new semiconducting suboxide $Mg_3O_2$ is thermodynamically stable above 500 GPa. Because of its stability, MgO is used as a model system for investigating vibrational properties of crystals. Magnesium oxide is produced by the calcination of magnesium carbonate or magnesium hydroxide.

In an embodiment of the present technology, referring still to FIG. 1, the bottom electrode 14 is selected from the group of materials consisting of: cobalt iron alloy ($Co_{0.5}Fe_{0.5}$); silver (Ag); gold (Au); platinum (Pt); cobalt (Co); palladium (Pd); titanium (Ti); and titanium tungsten (TiW).

Each of these materials can be deposited on a substrate by either Molecular beam epitaxy (MBE) (please, see the discussion above), or by sputter deposition.

Sputter deposition is a physical vapor deposition (PVD) method of thin film deposition by sputtering. This involves ejecting material from a "target" that is a source onto a "substrate" such as a silicon wafer. Re-sputtering is re-emission of the deposited material during the deposition process by ion or atom bombardment. Sputtered atoms ejected from the target have a wide energy distribution, typically up to tens of eV (100,000 K). The sputtered ions (typically only a small fraction of the ejected particles is ionized—on the order of 1%) can ballistically fly from the target in straight lines and impact energetically on the substrates or vacuum chamber (causing re-sputtering).

Alternatively, at higher gas pressures, the ions collide with the gas atoms that act as a moderator and move diffusively, reaching the substrates or vacuum chamber wall and condensing after undergoing a random walk. The entire range from high-energy ballistic impact to low-energy thermalized motion is accessible by changing the background gas pressure.

The sputtering gas is often an inert gas such as argon. For efficient momentum transfer, the atomic weight of the sputtering gas should be close to the atomic weight of the target, so for sputtering light elements neon is preferable, while for heavy elements krypton or xenon are used. Reactive gases can also be used to sputter compounds. The compound can be formed on the target surface, in-flight or on the substrate depending on the process parameters. The availability of many parameters that control sputter deposition make it a complex process, but also allow experts a large degree of control over the growth and microstructure of the film.

An important advantage of sputter deposition is that even materials with very high melting points are easily sputtered while evaporation of these materials in a resistance evaporator or Knudsen cell is problematic or impossible. Sputter deposited films have a composition close to that of the source material. The difference is due to different elements spreading differently because of their different mass (light elements are deflected more easily by the gas) but this difference is constant.

Sputtered films typically have a better adhesion on the substrate than evaporated films. A target contains a large amount of material and is maintenance free making the technique suited for ultrahigh vacuum applications.

Sputtering sources contain no hot parts (to avoid heating they are typically water cooled) and are compatible with reactive gases such as oxygen. Sputtering can be performed top-down while evaporation must be performed bottom-up. Advanced processes such as epitaxial growth is possible.

Some disadvantages of the sputtering process are that the process is more difficult to combine with a lift-off for structuring the film. This is because the diffuse transport, characteristic of sputtering, makes a full shadow impossible. Thus, one cannot fully restrict where the atoms go, which can lead to contamination problems. Also, active control for layer-by-layer growth is difficult compared to pulsed laser deposition and inert sputtering gases are built into the growing film as impurities.

Pulsed laser deposition is a variant of the sputtering deposition technique in which a laser beam is used for sputtering. Role of the sputtered and re-sputtered ions and the background gas is fully investigated during the pulsed laser deposition process.

Sputtering sources often employ magnetrons that utilize strong electric and magnetic fields to confine charged plasma particles close to the surface of the sputter target. In a magnetic field, electrons follow helical paths around magnetic field lines, undergoing more ionizing collisions with gaseous neutrals near the target surface than would otherwise occur. (As the target material is depleted, a "racetrack" erosion profile may appear on the surface of the target.)

The sputter gas is typically an inert gas such as argon. The extra argon ions created because of these collisions lead to a higher deposition rate. The plasma can also be sustained at a lower pressure this way. The sputtered atoms are neutrally charged and so are unaffected by the magnetic trap.

Charge build-up on insulating targets can be avoided with the use of RF sputtering where the sign of the anode-cathode bias is varied at a high rate (commonly 13.56 MHz). RF sputtering works well to produce highly insulating oxide films but with the added expense of RF power supplies and impedance matching networks. Stray magnetic fields leaking from ferromagnetic targets also disturb the sputtering process. Specially designed sputter guns with unusually strong permanent magnets must often be used in compensation.

In an embodiment of the present technology, referring still to FIG. 1, the bottom layer 16 is selected from the group of materials consisting of: chromium dioxide ($CrO_2$); half-metallic ferromagnetic oxide $Sr_2FeMoO_6$; Heusler alloy $Co_2MnGe$; Heusler alloy $Co_2MnSi$ (CMS); Heusler alloy $Co_2FeSi$ (CFS); Heusler alloy $Co_2MnSn$ (CMS); and Heusler alloy $Co_2FeAl_{0.5}Si_{0.5}$ (CFAS).

Example I

For example, in the paper published recently in *Nat Commun.*, 2014 May 30; 5: 3974. *"Direct observation of half-metallicity in the Heusler compound Co2MnSi"* by M. Jourdan et al., $Co_2MnSi$ samples were prepared and investigated completely in situ in an ultrahigh vacuum cluster consisting of sputtering chambers, an molecular beam epitaxy (MBE) chamber, and a Synchrotron radiation ultraviolet photoemission spectroscopy (SRUPS) chamber equipped with a He gas discharge lamp (hv=21.2 eV) and a hemispherical energy analyzer with multi-channel spin filter (energy resolution≅400 meV, Sherman function S=0.42±0.05). First, an epitaxial buffer layer of the Heusler compound Co2MnGa (30 nm) was grown on the MgO(100) substrate by radio frequency (RF)-sputtering at room temperature. By an optimized additional annealing process at 550° C. L21 order is obtained as shown by high energy electron diffraction (RHEED) and X-ray diffraction (XRD). Co2MnSi (70 nm) was RF-sputtered on top at room temperature. Induced by the buffer layer the Co2MnSi thin films show already some degree of L21 surface order as deposited. By additional annealing the order is improved as demonstrated for the film surface by RHEED.

In an embodiment of the present technology, referring still to FIG. 1, the tunnel junction 18 is selected from the group of materials consisting of: magnesium oxide (MgO); aluminum oxide ($Al_2O_3$); and spinel $MgAl_2O_4$.

Example II

In the paper *"Low-temperature atomic layer deposition of MgO thin films on Si"* by S Vangelista et al., published in *Journal of Physics D: Applied Physics*, Volume 46, Number 48, Magnesium oxide (MgO) films have been grown by atomic layer deposition in the wide deposition temperature window of 80-350° C. by using his (cyclopentadienyl) magnesium and $H_2O$ precursors. MgO thin films are deposited on both HF-last Si (100) and $SiO_2$/Si substrates at a constant growth rate of ~0.12 nm cycle$^{-1}$. The structural, morphological and chemical properties of the synthesized MgO thin films are investigated by x-ray reflectivity, grazing incidence x-ray diffraction, time-of-flight secondary ion mass spectrometry and atomic force microscopy measurements. MgO layers are characterized by sharp interface with the substrate and limited surface roughness, besides good chemical uniformity and polycrystalline structure for thickness above 7 nm. CV measurements performed on Al/MgO/Si MOS capacitors, with MgO in the (4.6-11) nm thickness range, allow determining a dielectric constant (κ)~11. Co layers are grown by chemical vapor deposition in direct contact with MgO without vacuum-break (base pressure $10^{-5}$-$10^{-6}$ Pa). The as-grown Co/MgO stacks show sharp interfaces and no elements inter diffusion among layers. C-V and I-V measurements have been conducted on Co/MgO/Si MOS capacitors. The dielectric properties of MgO are not influenced by the further process of Co deposition.

In an embodiment of the present technology, referring still to FIG. 1, the spin injector 20 is selected from the group of materials consisting of: chromium dioxide ($CrO_2$); half-metallic ferromagnetic oxide $Sr_2FeMoO_6$; Heusler alloy $Co_2MnGe$; Heusler alloy $Co_2MnSi$ (CMS); Heusler alloy $Co_2FeSi$ (CFS); Heusler alloy $Co_2MnSn$; and Heusler alloy $Co_2FeAl_{0.5}Si_{0.5}$ (CFAS).

Example III

In the paper *"Structural and magnetic properties and tunnel magnetoresistance for $Co_2(Cr,Fe)Al$ and $Co_2FeSi$ full-Heusler alloys"* by K Inomata et al., published in *Journal of Physics D: Applied Physics*, Volume 39, Number 5, the structure and magnetization of $Co_2(Cr_{1-x}Fe_x)Al$ (0≤x≤1) and $Co_2FeSi$ full-Heusler alloy have been investigated. The films were deposited on thermally oxidized Si ($SiO_2$) and MgO (001) single crystal substrates by ultra-high vacuum sputtering at various temperatures. The films were also post-annealed after deposition at room temperature (RT). Magnetic tunnel junctions with a full-Huesler alloy electrode were fabricated with a stacking structure of $Co_2YZ$ (20 nm)/Al (1.2 nm)-oxide/$Co_{75}Fe_{25}$ (3 nm)/IrMn (15 nm)/Ta (60 nm) and microfabricated using electron beam lithography and Ar ion etching with a $10^2$ μm$^2$ junction area, where $Co_2YZ$ stands for $Co_2(Cr_{1-x}Fe_x)Al$ or $Co_2FeSi$. The tunnel barriers were formed by the deposition of 1.2 nm Al, followed by plasma oxidization in the chamber. The x-ray diffraction revealed the A2 or B2 structure depending on heat treatment conditions and the substrate, but not $L2_1$ structure for the $Co_2(Cr_{1-x}Fe_x)Al$(0≤x≤1) films. The $L2_1$ structure, however, was obtained for the $Co_2FeSi$ films when deposited on a MgO (001) substrate at elevated temperatures above 473 K. The maximum tunneling magnetoresistance (TMR) was obtained with 52% at RT and 83% at 5 K for a junction using a $Co_2(Cr_{0.4}Fe_{0.6})Al$ electrode. While the junction using a $Co_2FeSi$ electrode with the $L2_1$ structure exhibited the TMR of 41% at RT and 60% at 5 K, which may be improved by using a buffer layer for reducing the lattice misfit between the $Co_2FeSi$ and MgO (001) substrate.

In an embodiment of the present technology, referring still to FIG. 1, the pinning layer 22 is selected from the group of materials consisting of: iridium manganese chromium (IrMnCr); iridium manganese (IrMn); nickel manganese (NiMn); nickel manganese chromium (NiMnCr); nickel manganese iron (NiMnFe); nickel manganese iridium (NiMnIr); nickel manganese palladium (NiMnPd); nickel manganese platinum (NiMnPt); nickel manganese rhodium (NiMnRh); platinum-manganese (PtMn), and nickel manganese ruthenium (NiMnRu).

Example IV

In the paper "Magnetic Tunnel Junction Materials for Electronic Applications" by J. M. Slaughter et al., published in *JOM-e*, 52 (6) (2000), http://www.tms.org/pubs/journals/JOM/0006/Slaughter/Slaughter-0006.html, a ferromagnetic thin film is pinned when placed in contact with an antiferromagnetic (AF) thin film due to exchange coupling. For an uncoupled, free, ferromagnetic film, the magnetic orientation of the film displays a hysteretic behavior pointing in the direction of the last applied saturating field. If a saturating field is applied and then taken away, the magnetic orientation of this free film will be in the direction of that field. If the direction of the applied saturating field is reversed and again taken away, the magnetic orientation of the film will be reversed. Thus, in zero applied field, either orientation is possible. A ferromagnetic film pinned by an AF layer displays similar behavior, but has an offset. In zero field, the ferromagnetic film will align in one direction. An exchange coupling between the ferromagnetic and AF layers, at their mutual interface, causes the ferromagnetic layer to be preferentially aligned in one direction. For the memory devices in question, this preferential alignment or pinning is used to lock one layer in a fixed direction. Much of the work on AF pinning materials, and of others in the field, has revolved around manganese-based antiferromagnetic materials such as Pt—Mn, Ir—Mn, Rh—Mn, and Fe—Mn. Pt—Mn is a particularly interesting pinning material because it remains antiferromagnetic at relatively high temperatures. Unlike many of the commonly used AF alloys, as-deposited Pt—Mn is not AF. Instead, this material must be post annealed, resulting in a phase transformation from face-centered cubic (f.c.c.) to a face-centered tetragonal (f.c.t.) crystal structure. The f.c.t. phase of Pt—Mn is AF and will pin an adjacent ferromagnetic film. The pinning strength increases with annealing time. The shift and broadening of the Ni—Fe hysteresis loop in the annealed material is characteristic of a pinned ferromagnetic film. Once pinned, the exchange bias causes the magnetic orientation of the film to be in one direction at zero applied field.

In an embodiment of the present technology, referring still to FIG. 1, the pinning layer 22 further comprises a Ruderman-Kittel-Kasuya-Yosida (RUDERMAN-KITTEL-KASUYA-YOSIDA (RKKY)) non-magnetic pinning layer.

RKKY interaction exhibits the antiferromagnetic polarity for a Ruthenium spacer having the layer thickness at about 8 Å. For the reference, please see S. S. P. Parkin, "Spin Engineering: *Direct determination of the Ruderman-Kittel-Kasuya-Yosida far-field function in ruthenium*", Phys. Rev B 44 (13), 1991.

In an embodiment of the present technology, using a Ru spacer as a pinning layer with thickness of about 8 Å we can orient the magnetization of spin injector 20 antiparallel to the magnetization of the bottom layer 16 which would allow to inject the maximum minority current into the bottom layer 16 comprising the Magnon Gain Medium. The injection of maximum minority current would substantially simplify reaching the magnon lazing point.

In an embodiment of the present technology, referring still to FIG. 1, the top electrode 24 is selected from the group of materials consisting of: cobalt iron alloy ($Co_{0.5}Fe_{0.5}$); silver (Ag); gold (Au); platinum (Pt); cobalt (Co); palladium (Pd); titanium (Ti); and titanium tungsten (TiW). Each of these materials can be deposited by either MBE or sputtering.

In an embodiment of the present technology, referring still to FIG. 1, both spin injector 20 and pinning layer 22 are replaced by a single layer of electron injector. In this embodiment, the electron injector is selected from the group of materials consisting of: a metal; a metal alloy; a ferromagnetic metal; and a ferromagnetic alloy.

Figure 2:
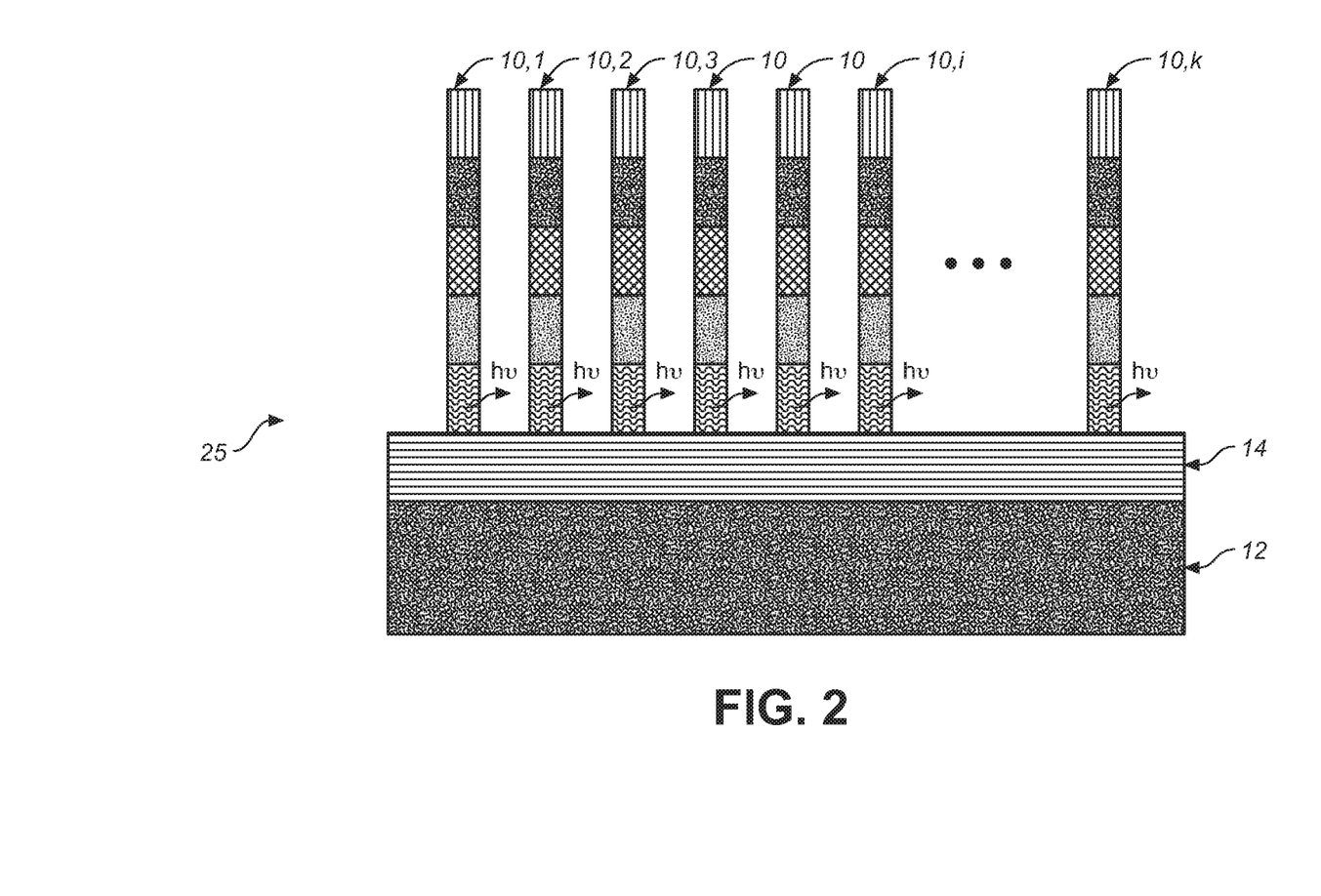
FIG. 2 is a front view of a terahertz generator comprising a plurality of single terahertz magnon lasers, each such single terahertz magnon laser further comprising a single multilayer column, for the purposes of the present technology.

In an embodiment of the present technology, FIG. 2 is a front view 25 of a terahertz generator comprising a plurality of single terahertz magnon lasers, each such single terahertz magnon laser further comprising a single multilayer column {10,1; 10,2; 10,i; . . . 10,k}; wherein i and k are integers. Each such single multilayer column 10,i is coupled with the ground electrode 14, whereas the ground electrode 14 is coupled with the substrate 12.

Figure 3:
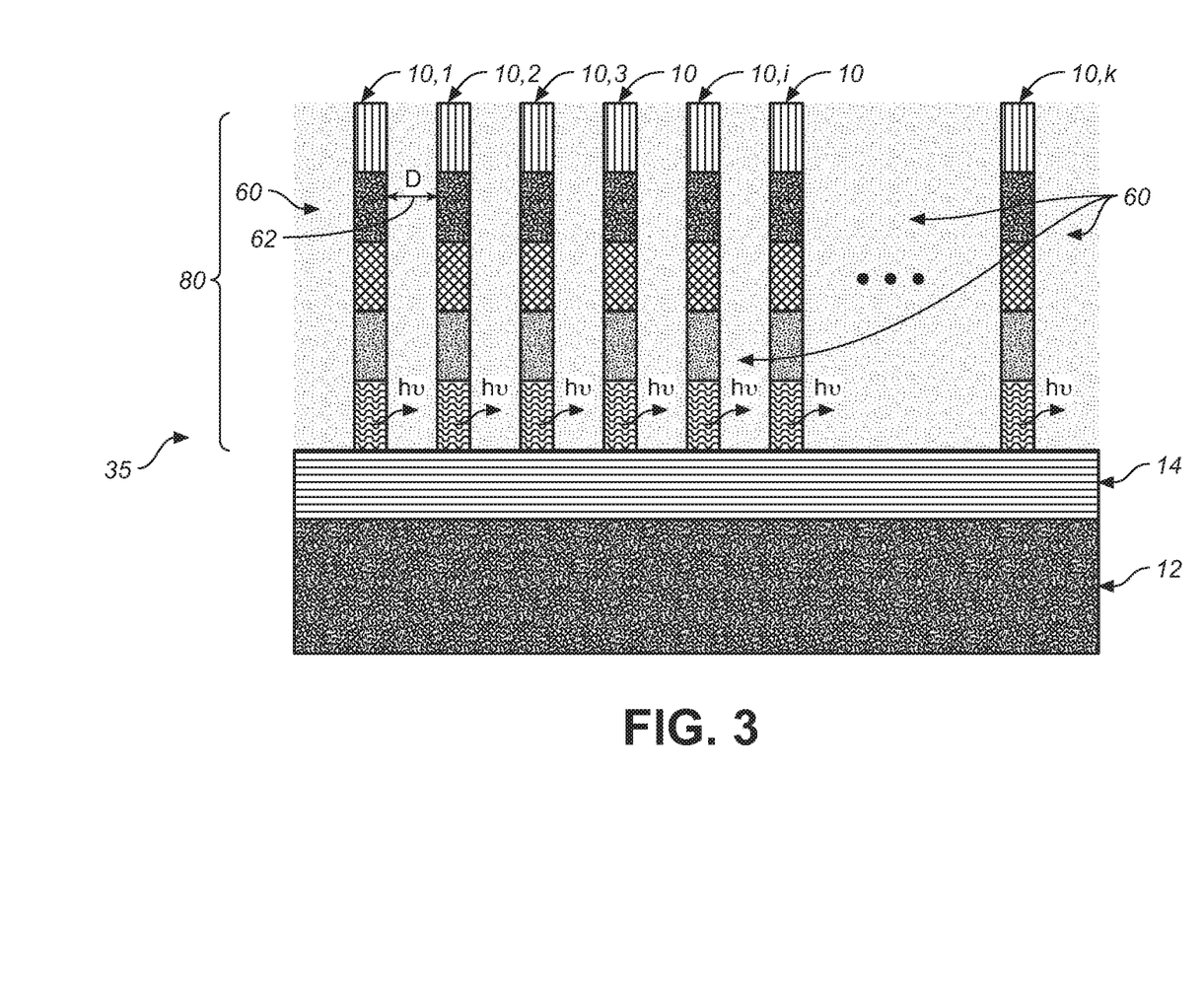
FIG. 3 illustrates a front view of a terahertz generator comprising a plurality of single terahertz magnon lasers, each such single terahertz magnon laser further comprising a single multilayer column, and terahertz transparent medium separating at least two such single multilayer columns for the purposes of the present technology.

In an embodiment of the present technology, FIG. 3 illustrates a front view 35 of a terahertz generator comprising a plurality of single terahertz magnon lasers 10,1; 10,2 . . . 10,i, . . . 10, k;, i and k are integers; each such single terahertz magnon laser further comprising a single multilayer column 80, a bottom electrode 14, and a substrate, 12 and terahertz transparent medium 60 separating at least two such single multilayer columns. The bias voltage (not shown) applied across each single terahertz magnon laser 10,i, from the top layer to the bottom electrode 14 is configured to inject the spin current from the spin injector into the bottom layer comprising Magnon Gain Medium The injected current enables transition of the spin down electron from the spin injector into the sub band with spin down of the bottom layer comprising Magnon Gain Medium via the tunnel junction which triggers the magnon lazing process by passing into the sub band with spin up of the bottom layer comprising Magnon Gain Medium that results in generation of terahertz radiation that emanates from the top surface 45 (of FIG. 4) of the device. For the reference, please see U.S. Pat. Nos. 7,430,074; 7,508,578; 9,136,665.

In an embodiment of the present technology, referring still to FIG. 3, the distance D between any two neighboring multilayer columns, (for example, the distance 62 between two neighboring multilayer columns 10,1 and 10,2,) should be greater than the wavelength $\lambda_{THz}$ of the emanated terahertz signal so that each generated THz photon could be born outside the Magnon Gain Medium area.

$$D > \lambda_{THz} \tag{Eq. 1}$$

In an embodiment of the present technology, referring to FIG. 3, the terahertz transparent medium 60 is selected from the group of materials consisting of: a crystal terahertz transparent material; and a polymer terahertz transparent material.

In an embodiment of the present technology, referring to FIG. 3, the terahertz transparent medium 60 is selected from the group of crystal materials consisting of High Resistivity Float Zone Silicon (HRTZ-Si); crystal quartz; and sapphire.

The crystals such as silicon, crystal quartz, and sapphire are important for THz optics production. For the reference, please see X.-C. Zhang, J. Xu, Introduction to THz Wave Photonics, Springer Science+Business Media, LLC 2010.

Besides synthetic diamond high resistivity silicon is the only isotropic crystalline material suitable for the extremely wide range from NIR (1.2 μm) to Millimeter (1000 μm) waves and more. In comparison with diamond it is rather cheaper to grow and machine. Moreover, it may have considerably bigger dimensions that allows manufacturing the elements of fast-developing THz electronics based on that.

One of the best materials for wavelengths above 50 μm is z-cut crystal quartz. It is important that z-cut crystal quartz windows are transparent in the visible range allowing easy adjustment with HeNe laser, do not change the state of light polarization, and can be cooled down below the λ-point of liquid helium. Crystal quartz is birefringent material that should be noted if the polarization of radiation is important.

Sapphire like crystalline quartz is transparent in THz region as well as in visible one. For measured samples with thicknesses from 1 to 5 mm transmission lower 600 μm strongly depends on sample thickness. Like HRFZ-Silicon, sapphire also can be used for manufacturing of photoconductive antennas for THz because of similar refractive index value in THz.

In an embodiment of the present technology, referring to FIG. 3, the terahertz transparent medium 60 is selected from the group of polymer materials consisting of: High Density Polyethylene (HDPE); Polymethylpentene (TPX); polyethylene (PE); and polytetrafluoroethylene (PTFE).

Among large variety of available polymers there are some of excellent terahertz transparencies with relatively low reflectivity. The best materials in this sense are TPX (polymethylpentene), polyethylene (PE), polypropylene (PP), and polytetrafluoroethylene (PTFE or Teflon). At longer wavelengths, the transmission of these polymers is structure less and flat. Going to shorter wavelengths, mainly below 200 µm, characteristic bands of intrinsic vibrations appear and scattering due to inhomogeneities increases. Polymers generally become increasingly opaque at shorter wavelengths.

Polymethylpentene (TPX) is the lightest of all known polymers. It is optically transparent in UV, visible, and THz ranges, what for example allows using a HeNe laser beam for alignment. Index of refraction is ~1.46 and is relatively independent on wavelength. Losses are very low up to mm-wavelengths. TPX has excellent heat resistance and is highly resistant to most organic and inorganic commercial chemicals. TPX is a hard solid material which can be mechanically shaped into various optical components like lenses and windows. Also, specifically TPX is used in $CO_2$ laser pumped molecular lasers as output window because it is transparent in the whole terahertz range and totally suppresses the ~10 µm pump radiation. Also, TPX windows are used in cryostats as "cold" windows. The THz transparency of TPX does not change in dependence on temperature. Temperature coefficient of refractive index is $3.0*10^{-4}$ $K^{-1}$ (for the range 8-120 K). In comparison with other materials being used for operating in THz range TPX shows excellent optical properties and for example can be good substitution for Picarin (Tsurupica) lenses. In addition, TPX is cheaper and commercially available in opposite to Picarin.

Polyethylene (PE) is light elastic crystallizing material. It can be heated up to 110° C. and cooled down to −45÷−120° C. depending on grade. PE has good dielectric characteristics, chemical resistance, and radio resistance. Contrariwise, it is unstable to UV-radiation, fats, and oils. PE is biologically inert, is easy to be processed. Density (23° C.) is 0.91-0.925 g/cm3. Tensile flow limit (23° C.) is 8-13 MPa. Modulus of elasticity (23° C.) is 118-350 MPa. Refractive index is ~1.54 and is rather equal within wide wavelength region. Usually high-density polyethylene (HDPE) is used for component's production. Besides quite thick lenses and windows, thin HDPE films are used for THz polarizers. In addition, HDPE is used as the window for Golay cells. THz transmission of HDPE doesn't depend on temperature that allows using HDPE windows in cryostats. Temperature coefficient of refractive index is $6.2*10^{-4}$ $K^{-1}$ (for the range 8-120 K).

Polytetrafluoroethylene (PTFE) is a white solid at room temperature, with a density of about 2.2 $g/cm^3$. Its melting point is 327° C., though its properties remain at a useful level over a wide temperature range of −73° C. to 204° C. Refractive index is ~1.43 within wide wavelength region.

Figure 4:
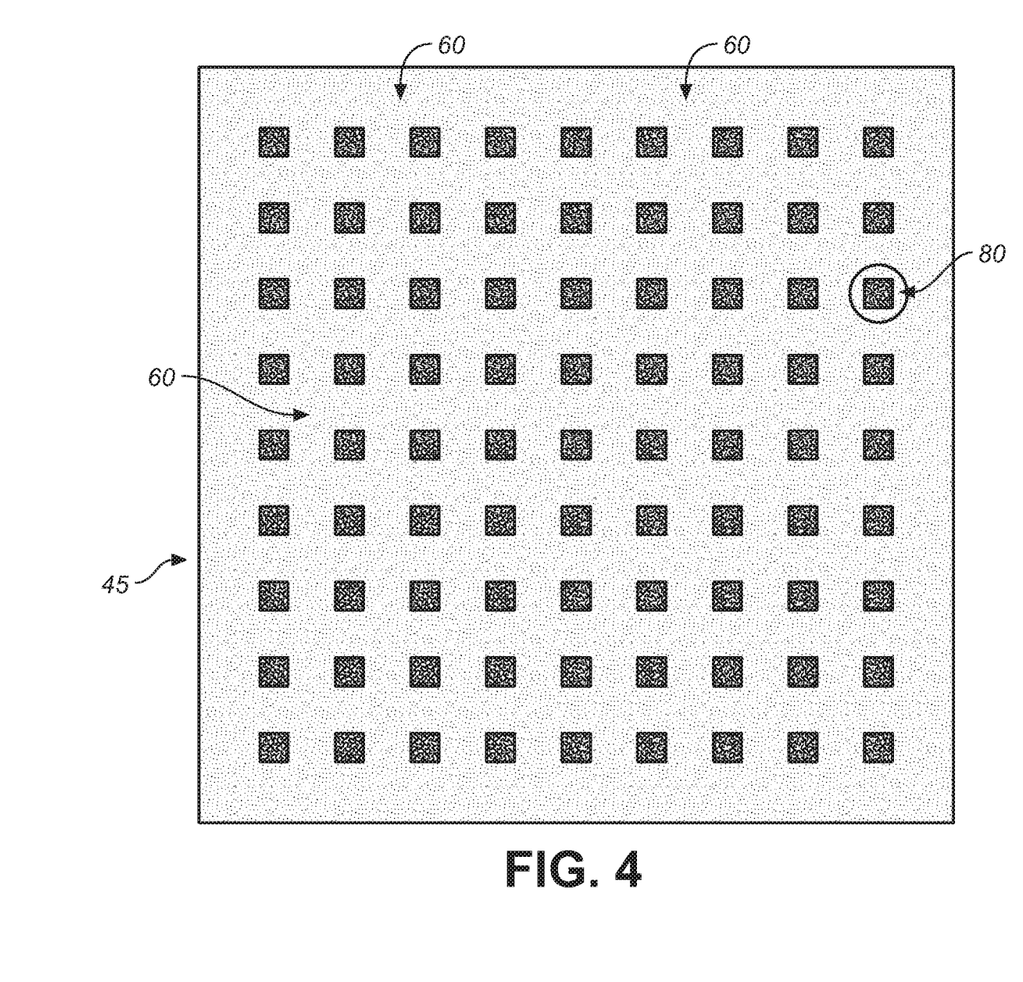
FIG. 4 shows a top view of a terahertz generator comprising a plurality of single terahertz magnon lasers, each such single terahertz magnon laser further comprising a single multilayer column, and terahertz transparent medium filled in between such single multilayer columns for the purposes of the present technology.

In an embodiment of the present technology, FIG. 4 shows a top view 100 of a terahertz generator comprising a plurality of single terahertz magnon lasers 102, each such single terahertz magnon laser further comprising a single multilayer column (not shown), and terahertz transparent medium 110 filled in between such single multilayer columns.

In an embodiment of the present technology, at least one single terahertz magnon laser 10,i (of FIG. 3) generates terahertz radiation based on magnon laser effect. For the reference, please see U.S. Pat. Nos. 7,430,074; 7,508,578; 9,136,665.

In an embodiment of the present technology, a method for generating a terahertz signal by using the apparatus 25 of FIG. 2 comprising a plurality of terahertz magnon laser generators (10, 1-10, k) and a terahertz transparent medium (60 of FIG. 3) separating at least two such terahertz magnon laser generators is provided. At least one such terahertz magnon laser generator 15 of FIG. 1 comprises: a substrate 12; a bottom electrode 14 coupled to the substrate 12; and a multilayer column 10 coupled to the bottom electrode 14, The multilayer column further comprising a bottom layer 16 further comprising Magnon Gain Medium; a tunnel junction 18 coupled to the bottom layer 16; a top layer 20 coupled to the tunnel junction 18; the top layer 20 comprising a spin injector; a pinning layer 22 coupled to the spin injector 20; and a top electrode 24 coupled to the pinning layer 22.

In an embodiment of the present technology, the method for generating a terahertz signal by using the apparatus 25 of FIG. 2 further comprises: (A) fixing the magnetization of the spin injector 20 in antiparallel orientation relative to the magnetization of the bottom layer 16 comprising the Magnon Gain Medium; and (B) applying voltage across at least one such multilayer column 10 between the top electrode 24 and the bottom electrode 14; wherein the terahertz radiation signal is configured to propagate via the terahertz transparent medium (60 of FIG. 3).

In an embodiment of the present technology, the method for generating a terahertz signal by using the apparatus 25 of FIG. 2 further comprises: (A1) using the RKKY pinning layer 22 (of FIG. 1); and (A2) selecting the thickness of the RKKY pinning layer to fix the magnetization of the spin injector in antiparallel orientation relative to the magnetization of the bottom layer 16 comprising said Magnon Gain Medium;

In an embodiment of the present technology, the method for generating a terahertz signal by using the apparatus 25 of FIG. 2 further comprises the step (C) of separating each pair of such multilayer columns by a distance D (62 of FIG. 3) greater than the wavelength of the generated terahertz signal.

The above discussion has set forth the operation of various exemplary systems and devices, as well as various embodiments pertaining to exemplary methods of operating such systems and devices. In various embodiments, one or more steps of a method of implementation (calculating the optimum voltage bias, for example) are carried out by a processor under the control of computer-readable and computer-executable instructions. Thus, in some embodiments, these methods are implemented via a computer.

In an embodiment, the computer-readable and computer-executable instructions may reside on computer useable/readable media.

Therefore, one or more operations of various embodiments may be controlled or implemented using computer-executable instructions, such as program modules, being executed by a computer. Generally, program modules include routines, programs, objects, components, data structures, etc., that perform particular tasks or implement particular abstract data types. In addition, the present technology may also be practiced in distributed computing environments where tasks are performed by remote processing devices that are linked through a communications network. In a distributed computing environment, program modules may be located in both local and remote computer-storage media including memory-storage devices.

Although specific steps of exemplary methods of implementation are disclosed herein, these steps are examples of steps that may be performed in accordance with various exemplary embodiments. That is, embodiments disclosed herein are well suited to performing various other steps or variations of the steps recited. Moreover, the steps disclosed herein may be performed in an order different than presented, and not all of the steps are necessarily performed in a particular embodiment.

Although various electronic and software based systems are discussed herein, these systems are merely examples of environments that might be utilized, and are not intended to suggest any limitation as to the scope of use or functionality of the present technology. Neither should such systems be interpreted as having any dependency or relation to any one or combination of components or functions illustrated in the disclosed examples.

Although the subject matter has been described in a language specific to structural features and/or methodological acts, the subject matter defined in the appended claims is not necessarily limited to the specific features or acts described above. Rather, the specific features and acts described above are disclosed as exemplary forms of implementing the claims.

What is claimed is:

1. The apparatus for generation of tunable terahertz radiation comprising:
   a plurality of terahertz magnon laser generators;
      at least one said terahertz magnon laser generator comprising:
         a substrate;
         a bottom electrode coupled to said substrate; and
         a multilayer column coupled to said bottom electrode comprising: a bottom layer coupled to said bottom electrode; said bottom layer comprising Magnon Gain Medium; a tunnel junction coupled to said bottom layer; a top layer coupled to said tunnel junction; said top layer comprising a spin injector; a pinning layer coupled to said spin injector; and a top electrode coupled to said pinning layer comprising a Ruderman-Kittel-Kasuya-Yosida (RUDDERMAN-KITTEL-KASUYA-YOSIDA (RKKY)) non-magnetic pinning layer coupled to said spin injector; and a top electrode coupled to said pining layer;
   and a terahertz transparent medium separating at least two said terahertz magnon laser generators;
   wherein at least one said terahertz magnon laser generator is configured to generate a Terahertz radiation signal;
   wherein each pair of said multilayer columns is separated by a distance greater than the wavelength of said generated terahertz signal;
   and wherein said apparatus is configured to emit said terahertz radiation signal configured to propagate via said terahertz transparent medium.

2. The apparatus of claim 1, wherein at least one said multilayer column further comprises:
   a bottom layer coupled to said bottom electrode; said bottom layer further comprising Magnon Gain Medium;
   a tunnel junction coupled to said bottom layer;
   a top layer coupled to said tunnel junction; said top layer comprising an electron injector; and
   a top electrode coupled to said top layer.

3. The apparatus of claim 2, wherein said bottom layer further comprises a ferromagnetic material selected from the group consisting of:
   a ferromagnetic semiconductor; a dilute magnetic semiconductor (DMS); a half-metallic ferromagnet (HMF); and a ferromagnetic conductor, with a gap in the density of states of the minority electrons around the Fermi level of said ferromagnetic material.

4. The apparatus of claim 3, wherein said half-metallic ferromagnet (HMF) is selected from the group consisting of:
   a spin-polarized Heusler alloy; a spin-polarized Colossal magnetoresistance material; and $CrO_2$.

5. The apparatus of claim 4, wherein said spin-polarized Heusler alloy is selected from the group consisting of:
   half-metallic ferromagnetic oxide $Sr_2FeMoO_6$; Heusler alloy $Co_2MnGe$; Heusler alloy $Co_2MnSi$ (CMS); Heusler alloy $Co_2FeSi$ (CFS); Heusler alloy $Co_2MnSn$; and Heusler alloy $Co_2FeAl_{0.5}Si_{0.5}$ (CFAS).

6. The apparatus of claim 2; wherein said tunnel junction is selected from the group of materials consisting of:
   magnesium oxide (MgO); aluminum oxide ($Al_2O_3$); and spinel $MgAl_2O_4$.

7. The apparatus of claim 1, wherein said spin injector is selected from the group consisting of:
   a half-metal; and a ferromagnetic alloy.

8. The apparatus of claim 1, wherein said pinning layer further comprises:
   an antiferromagnetic pinning layer selected from the group of materials consisting of: iridium manganese chromium (IrMnCr); iridium manganese (IrMn); nickel manganese (NiMn); nickel manganese chromium (NiMnCr); nickel manganese iron (NiMnFe); nickel manganese iridium (NiMnIr); nickel manganese palladium (NiMnPd); nickel manganese platinum (NiMnPt); nickel manganese rhodium (NiMnRh); platinum-manganese (PtMn), and nickel manganese ruthenium (NiMnRu).

9. The apparatus of claim 1; wherein said substrate is selected from the group of materials consisting of:
   gallium arsenide (GaAs); aluminum oxide ($Al_2O_3$); aluminum nitride (AlN); indium-tin-oxide (InTnO); silicon (Si); silicone on sapphire (SoS); and magnesium oxide (MgO).

10. The apparatus of claim 1; wherein said bottom electrode is selected from the group of materials consisting of:
    cobalt iron alloy ($Co_{0.5}Fe_{0.5}$); silver (Ag); gold (Au); platinum (Pt); cobalt (Co); palladium (Pd); titanium (Ti); and titanium tungsten (TiW).

11. The apparatus of claim 1; wherein said terahertz transparent medium is selected from the group of materials consisting of:
    a crystal terahertz transparent medium; and a polymer terahertz transparent medium.

12. The apparatus of claim 11; wherein said crystal terahertz transparent medium is selected from the group crystal materials consisting of:
    High Resistivity Float Zone Silicon (HRTZ-Si); crystal quartz; and sapphire.

13. The apparatus of claim 11; wherein said polymer terahertz transparent medium is selected from the group of polymer materials consisting of:

High Density Polyethylene (HDPE); Polyethylene (TPX); polyethylene (PE); and polytetrafluoroethylene (PTFE).

14. A method for generating a terahertz signal by using an apparatus comprising a plurality of terahertz magnon laser generators; at least one said terahertz magnon laser generator comprising: a substrate; a bottom electrode coupled to said substrate; a multilayer column coupled to said bottom electrode; and a terahertz transparent medium separating at least two said terahertz magnon laser generators; said multilayer column further comprising a bottom layer further comprising Magnon Gain Medium; a tunnel junction coupled to said bottom layer; a top layer coupled to said tunnel junction; said top layer comprising a spin injector; a pinning layer comprising a Ruderman-Kittel-Kasuya-Yosida (RUDERMAN-KITTEL-KASUYA-YOSIDA (RKKY)) non-magical pinning layer coupled to said spin injector; and a top electrode coupled to said pinning layer; said method comprising:

(A) fixing the magnetization of said spin injector in antiparallel orientation relative to the magnetization of said bottom layer comprising said Magnon Gain Medium;

(B) applying voltage across at least one said multilayer column between said top electrode and said bottom electrode; and (C) separating each pair of said multilayer columns by a distance greater than the wavelength of said generated terahertz signal;

wherein said apparatus is configured to emit terahertz radiation signal configured to propagate via said terahertz transparent medium.

15. The method of claim 14; wherein said step (A) further comprises:

(A1) using the RKKY pinning layer; and (A2) selecting the thickness of said RKKY pinning layer to fix the magnetization of said spin injector in antiparallel orientation relative to the magnetization of said bottom layer comprising said Magnon Gain Medium.

16. A method for generating a terahertz signal by using an apparatus comprising a plurality of terahertz magnon laser generators; at least one said terahertz magnon laser generator comprising: a substrate; a bottom electrode coupled to said substrate; a multilayer column coupled to said bottom electrode; and a terahertz transparent medium separating at least two said terahertz magnon laser generators; said multilayer column further comprising a bottom layer further comprising Magnon Gain Medium; a tunnel junction coupled to said bottom layer; a top layer coupled to said tunnel junction; said top layer comprising a spin injector; a pinning layer comprising a Ruderman-Kittel-Kasuya-Yoshida (RUDERMAN-KITTEL-KASUYA-YOSHIDA (RKKY)) non-magical pinning layer coupled to said spin injector; and a top electrode coupled to said pinning layer; said method comprising:

(A) fixing the magnetization of said spin injector in a certain direction;

(B) applying a bias voltage across at least one said multilayer column between said top electrode and said bottom electrode; and (C) separating each pair of said multilayer columns by a distance greater than the wavelength of said generated terahertz signal;

wherein said apparatus is configured to emit terahertz radiation signal configured to propagate via said terahertz transparent medium.

* * * * *